UNITED STATES PATENT OFFICE.

EDWARD HART, OF EASTON, PENNSYLVANIA.

PROCESS OF MAKING POTASH ALUM.

1,062,278. Specification of Letters Patent. Patented May 20, 1913.

No Drawing. Application filed March 27, 1911. Serial No. 617,008.

*To all whom it may concern:*

Be it known that I, EDWARD HART, a citizen of the United States, and resident of Easton, Pennsylvania, have invented certain new and useful Improvements in the Process of Making Potash Alum, of which the following is a specification.

My invention relates to the manufacture of potash and other products, and also of a pure silica, from the decomposition of feldspar and like rocks, the object thereof being to provide a simple, efficient and economical method which can be successfully practised on any desired scale.

I have discovered that when feldspar or similar rock is mixed with potassium or sodium sulfate and carbon and heated to fusion in a suitable furnace there is formed a soluble glass consisting of a potassium or sodium aluminum silicate. This glass may readily be decomposed by the addition of a suitable acid such as sulfuric acid forming what is practically a pure silica and also a solution from which potassium and aluminum may be obtained in the form of common potash alum, leaving a mother liquor containing sulfates of potassium or sodium and aluminum, some free sulfuric acid, and other sulfates formed from impurities in the feldspar such as iron sulfate and sodium or potassium sulfate. From this mother liquor, by suitable processes hereinafter more fully described, I obtain aluminate of soda or potash, or both.

The following example will illustrate in detail one specific method of carrying out my invention:—To 278 parts by weight of orthoclase feldspar ($KAlSi_3O_8$ and impurities) I add 174 parts by weight of potassium sulfate ($K_2SO_4$), or 142 parts, by weight, of sodium sulfate ($Na_2SO_4$) and 24 parts, by weight, of carbon, or its equivalent amount in the form of coke, anthracite coal, or other carbonaceous material. The mixture is fused in a suitable furnace, for instance a blast furnace, a reverberatory furnace or an electric furnace to a suitable temperature, for instance from 1300° to 1500° C. The glass thus produced is finely pulverized and treated with a suitable acid, such as sulfuric acid. I find that good results are obtained by using a mixture of one part of oil of vitriol with one part of water. The amount to be used of this solution varies somewhat according to the nature of the feldspar employed and also to the sulfate employed, but will be approximately 140 parts by weight of the solution to 100 parts by weight of the glass. The mixture of glass and acid is then evaporated and then heated to a temperature of about 150° C. for at least an hour so as to decompose the glass completely and to form uncombined silica ($SiO_2$). The resulting product is then boiled with water, and the insoluble silica is separated by filtration or in any other manner well known to those skilled in the art. The insoluble silica thus obtained usually contains carbon and some water. It is heated to redness to drive off the water and to burn the carbon, thus leaving an almost pure silica quite free from iron, and suitable for use in the manufacture of pottery and for other purposes. The filtrate, or remaining solution, is evaporated to the proper degree so as to deposit on cooling the potassium and aluminum in the form of common potash alum crystals substantially all the other salts such as iron, potassium, sodium and aluminum sulfates, together with some free sulfuric acid remaining in the solution in the mother liquor. This mother liquor is then evaporated to dryness and fused with a suitable amount of carbon. Large quantities of sulfur are given off, and the residue consists chiefly of aluminate of soda or potash or both, or of one or more of these substances together with alumina. If water be added to the residue the aluminate of soda or potash will be largely dissolved, leaving an insoluble residue consisting mainly of iron sulfid and possibly some alumina.

The solution may be decanted or filtered off and the aluminate of soda or potash recovered by evaporation, thus effecting a perfect separation of the iron and the alumina contained in the original feldspar. The residue if sufficiently rich in alumina, may be fused again with fresh quantities of sodium or potassium sulfate and carbon thus obtaining a further supply of aluminate of soda. Thus a perfect separation of the iron and the alumina contained in the original feldspar is effected. If desired, the aluminate of soda solution may be treated with carbon dioxid obtained in the first fusion hereinabove described, or by other methods well known to those skilled in the art. The resulting alumina may be sold as such, or subjected to further treatment, while the resulting sodium carbonate may be added to the first fusion, replacing a portion of the potassium or sodium sulfate. In fusing this mixture with coal I do not confine myself to any definite proportions, but find that when sodium sulfate is used in the original fusion with the feldspar a satisfactory result may be obtained by fusing 142 parts (by weight) of the dried mixture with 8 parts (by weight) of finely powdered coal.

When I speak in my claims of feldspar I intend to include any substance consisting of or containing a potassium or sodium aluminum silicate.

When I speak in my claims of employing in my reactions sodium sulfate and carbon I intend to include any equivalent substance or substances, as for instance the product of the reaction between these two substances, or potassium sulfate in place of sodium sulfate.

I claim:

1. The process hereinbefore described which comprises heating feldspar with sulfate of soda and carbon, and treating the product with a suitable acid.

2. The process hereinbefore described which comprises heating feldspar with sulfate of soda and carbon, and treating the product with sulfuric acid.

3. The process hereinbefore described which comprises heating feldspar with sulfate of soda and carbon, treating the product with a suitable acid, and separating the soluble and the insoluble products of the reaction.

4. The process hereinbefore described which comprises heating feldspar with sulfate of soda and carbon, treating the product with sulfuric acid, and separating the soluble and the insoluble products of the reaction.

5. The process hereinbefore described which comprises heating feldspar with sulfate of soda and carbon, treating the product with sulfuric acid, separating the soluble and the insoluble products of the reaction and removing from the soluble product the potash alum.

6. The process hereinbefore described which comprises heating feldspar with sulfate of soda and carbon, treating the product with sulfuric acid, separating the soluble and the insoluble products of the reaction and removing from the soluble product the potash alum and fusing the remaining sodium sulfate and aluminum sulfate with carbon.

In witness whereof I have hereunto set my hand in the presence of two subscribing witnesses.

EDWARD HART.

Witnesses:
 FRITZ V. BRIESEN,
 FRANK F. KIRKPATRICK.